United States Patent [19]

Chen

[11] Patent Number: 5,008,625

[45] Date of Patent: Apr. 16, 1991

[54] METHOD AND APPARATUS FOR LOGGING AND DISPLAYING A TWO DIMENSIONAL IMAGE OF SPONTANEOUS POTENTIAL

[75] Inventor: Min-Yi Chen, West Redding, Conn.

[73] Assignee: Schlumberger Technology Corporation, New York, N.Y.

[21] Appl. No.: 430,214

[22] Filed: Nov. 1, 1989

[51] Int. Cl.$^5$ .......................... G01V 3/26; G01V 3/34
[52] U.S. Cl. ..................................... 324/351; 324/367
[58] Field of Search ............... 324/351, 355, 366, 367, 324/374

[56] References Cited

U.S. PATENT DOCUMENTS

| | | | |
|---|---|---|---|
| 3,268,801 | 8/1966 | Clements et al. | 324/351 |
| 3,521,154 | 7/1970 | Maricelli | 324/374 |
| 3,638,105 | 1/1972 | Schuster. | |
| 3,691,456 | 9/1972 | Warren. | |
| 3,715,653 | 2/1973 | Sauter. | |
| 3,868,324 | 6/1974 | Espinasse. | |
| 3,914,686 | 10/1975 | Brooks | 324/351 |
| 4,451,790 | 5/1984 | Bravenec | 324/351 |
| 4,468,623 | 8/1984 | Gianzero et al. | 324/355 X |
| 4,523,148 | 6/1985 | Maciejewski | 324/351 |
| 4,567,759 | 2/1986 | Ekstrom et al. | 324/355 X |

OTHER PUBLICATIONS

Schulmberger Education Services; "Log Interpretation Principles/Applications"; 1987; pp. 1, 2, and 12–23.
Dr. Henri Doll; "The SP Log; Theoretical Analysis and Principles of Operation"; 2/16/48; 87 pages.
Schlumberger; "Formation Micro Scanner Service" 1986, 12 pages.
G. W. Hammack and W. H. Fertl, "Anomalies Observed on Well Logs" Jun. 2–5, 1974, pp. 3–5 and FIGS. 6–10.
J. R. Tabanou, R. Glowinski and G. F. Rouault, "SP Deconvolution and Quantitative Interpretation in Shaly Sands", Jun. 29–Jul. 2, 1987, 25 pages.

*Primary Examiner*—Gerard R. Strecker
*Attorney, Agent, or Firm*—Albert L. Free

[57] ABSTRACT

Method and apparatus for obtaining fine detail of spontaneous potential (SP) along a bore-hole wall in the earth, in connection with exploration for petrochemical deposits. A laterally-extending array of SP-sensing electrodes is mounted on an insulating pad, each slightly below the pad surface, and the pad is moved along and against the bore-hole wall while the SP's at the electronics are sampled and sent to up-hole electrodes for processing. The processed electrode samples are used to form a two-dimensional visually-observable image of the segment of the bore-hole wall swept over by the electrodes on the pad.

16 Claims, 8 Drawing Sheets

FIG. 3A

METHOD AND APPARATUS FOR LOGGING AND DISPLAYING A TWO DIMENSIONAL IMAGE OF SPONTANEOUS POTENTIAL

FIELD OF THE INVENTION

This invention relates to a method and apparatus for use in producing indications of variations in the structure of an earth formation, and more specifically to improvements in logging the spontaneous potential (SP) present at the wall of the earth formation.

BACKGROUND OF THE INVENTION

For purposes of geologic exploration, and especially in connection with exploring the earth for underground petrochemical fossil deposits, it is known to measure certain electrical properties existing along an earth-formation wall. Typically a bore hole is formed, as by a conventional rig, and with the bore hole filled with a drilling mud, an electrode structure on a pad is moved along the length of the bore hole while a voltage is applied between electrodes and pad, and the resultant currents and/or voltages present at the wall are monitored and recorded. Recording may be on magnetic tape, on a ink recorder, on a computer disk or in a computer memory, as examples. A simultaneous record of the position of the electrode structure along the wall is made, so that a plot of distance along the bore hole against a selected electrical property may be formed from the stored data.

The variations in the electrode currents and/or voltages thus monitored and displayed have been found to correlate with certain properties of the adjacent earth formation. One way in which this correlation can be determined is to form a hole in the earth by coring—that is, a narrow cylindrical cut is made into the earth and the core inside the cut removed intact, to leave the bore hole. Logging of the exposed bore hole wall is then performed, and the resultant measured electrical values at each depth compared with the structure and properties of the core at corresponding locations. Experience obtained with such coring correlations enables one to attribute specific physical, chemical and geologic properties to the values and shapes of logging waveforms which are obtained later in other bore holes, with a high degree of certainty.

More particularly, a popular technique for obtaining the desired resistivity measurements is to use an array of electrodes or "buttons" mounted on, but insulated from, an electrically conductive pad, which is urged against the bore hole wall as it is dragged upwardly, while a voltage or current level is applied between each button and a remote electrode in the mud or at the surface. The currents thereby produced flow at least in part from the electrodes through the bore hole wall, in a magnitude dependent upon the properties of the earth formation immediately adjacent the electrodes. Such procedures have been termed microresistivity measurements, since they measure the electrical resistivity of very small vertical segments of the wall structure.

While a separate logging waveform may be obtained for each electrode by such resistivity measurement, it has been found highly advantageous to convert the information producing such resistivity waveforms into a bi-dimensional visual image of the resistivity of the track along which the array is pulled. This image typically exhibits brightness variations corresponding to variations in resistivity of the strip or segment of wall which is traversed by the electrode array. One form of such system is the Formation Micro-Scanner (FMS TM) of Schlumberger Well Services, and has proved to be commercially successful for bore hole logging in the course of petrochemical exploration. Information relating to such systems is contained, for example, in U.S. Pat. Nos. 4,468,623 of Gianzero et al, issued Aug. 28, 1984, and 4,567,759 of Ekstrom et al, issued Feb. 4, 1986. One drawback of such systems is that they tend not to work well with oil-based muds, which have high resistivities. Since oil-based muds are highly desirable in some cases for reasons not related to the logging function, this limitation constitutes a substantial drawback in resistivity logging.

Furthermore, in some cases the resistivities of strata of quite different materials or physical configuration may not differ substantially from each other; for example, strata having very different sand and shale content may exhibit about the same resistivity, making their differences undetectable by micro-resistivity logging.

Another known procedure for obtaining indications of certain gross characteristics of the earth formation is to log the spontaneous potential (SP) of the exposed surface of a bore hole in an earth formation by pulling an electrode upwardly in the bore hole and using the measured electrical potential at the electrode as an indication of SP. The measured SP may then be displayed as a plot of SP versus distance along the bore hole. The SP electrode in such cases is typically mounted near the center of the bore hole, and while it produces some useful indications of gross variations in the nature and structure of the adjacent earth, the definition of which this arrangement is capable is typically quite poor, e.g. of the order of a foot. This has been adequate for the traditional purposes to which SP measurement has been directed, i.e. to distinguish thick shale formations from other formations, such as sand strata, and to determine formation water conductivity. However, in the evaluation of thinly laminated reservoirs, it is desirable to have resolutions of the order of 0.1 inch.

It is also know to conduct the logging of SP along a bore-hole wall by using an electrode recessed slightly below a surface of an electrically-insulating pad, and to pull the pad upwardly while the pad surface is urged against the bore-hole wall. While the resultant logging waveform was of some utility, it did not find wide general use because it did not produce sufficiently reliable, accurate, clear representations of SP in the adjacent earth formation.

The SP signal has two components: the electrochemical potential and the electrokinetic potential. The electrochemical potential arises from the diffusion of ions between the formation water and the drilling fluid under an ionic concentration difference. The electrokinetic potential arises from the movement of fluid from the borehole to the formation under a pressure difference. The electrochemical potential has been traditionally used to determine the formation water conductivity (related to formation water ionic concentration), an important parameter in formation evaluation. It can potentially be used to determine cation exchange capacity in shaly sand, again an important parameter in formation evaluation of shaly sand reservoirs. The electrokinetic potential may be used to monitor the movement of fluid through low permeability zones.

The strength of the source SP signal can be controlled only by changing the pressure or the ionic concentration of the borehole fluid. Such changes are impractical under most drilling conditions. In comparison, the voltages and currents injected during the resistivity type of measurements previously described can easily be adjusted by the operator to nearly any convenient level to produce an optimum level of measured signal. The prior ineffectiveness of conventional SP logging procedures for monitoring fine structure is, at least in part, due to the fact that strength of the SP cannot be easily controlled and the measurement is therefore especially vulnerable to noise.

Specifically, there are four important kinds of measurement noises and distortions which have affected SP measurements:

(1) changes in the potential of the reference electrode;
(2) polarization of the electrodes;
(3) bimetal currents; and
(4) the ohmic potential drop from the flow of the SP current in the borehole.

These four different kinds of noise may be explained as follows:

(1) The reference electrode is typically placed in the mud pit, or on the surface. The potential of this reference electrode can change during logging due to surface phenomena (weather, for example).

(2) All the measurement electrodes are made of metals which are subject to polarization effects. The measured potential between such electrodes therefore depends on surface states of electrodes which can change during logging.

(3) All tools have exposed metal parts. Any two different metals exposed to the drilling fluid form a battery, and the "bi-metal current" flowing between these two metals distorts the SP measurement.

(4) The borehole fluid is typically substantially conductive. SP currents flow in a closed loop; part of the loop is in the formation and part of the loop is in the borehole fluid. Conventionally, SP is measured with an electrode located in the center of the borehole which measures the ohmic drop in potential from the current flowing in the borehole. The measured SP is therefore only a part of the total potential (SSP, or Static SP). In the presence of many thinly layered beds, the ohmic drop in potential in the center of the borehole therefore depends in a complex way on the SSP along a substantial length of the formation, resulting in a signal of low definition. It is not possible to estimate the high definition SSP from the measured low definition ohmic drop in the center of the well.

It has been proposed to mount an SP-sensing electrode so that it is urged outwardly to bear directly against a surface of a bore hole as it is pulled upwardly, in an effort to improve the SP measurements. See for example U.S. Pat. No. 3,914,686 of R.H. Brooks, issued Oct. 21, 1975. However, to the best of applicant's knowledge, the particular SP electrode arrangement of the cited Brooks patent has never been used commercially, and it is now clear that it could not work properly as described in that patent, since the SP electrode will change drastically and unpredictably as it is pulled along the bore wall, in direct contact with it.

It is also known to use a pair of vertically-aligned electrodes positioned near the center of the borehole to produce absolute and relative SP values, and to combine the low-frequency components of the absolute SP with the high-frequency components of the relative SP's to obtain more accurate SP measurement. While helpful in this regard, SP has still remained a parameter of little commercial significance or value, especially with respect to obtaining indications of thin layers of differing SP's measured along the length of the bore hole.

Accordingly, an object of this invention is to provide a new and improved system and method for determining the geologic fine structure of earth formations by measuring spontaneous potential (SP).

Another object is to provide such an SP system and method which provide reliable indications of the fine structure of an exposed surface of an earth formation.

A further object is to provide such SP system and method in which SP fine structure can be discerned readily and accurately, even in the presence of substantial interfering, spurious signals or conditions, especially to distinguish between sand and shale strata or different degrees of shaliness.

It is a further object to provide such a method and apparatus which operates satisfactorily even with borehole muds of relatively high resistivities, such as oil-based muds.

BRIEF SUMMARY OF THE INVENTION

These and other objects of the invention are attained by the provision of a system and method in which an array comprising a plurality of electrodes laterally spaced from each other is positioned immediately adjacent, but slightly spaced from, a wall to be logged, and moved to different positions along the wall while measurements of the SP are made at each electrode. These SP-representing signals are used to produce a two-dimensional visual image of SP over and along the segment of the wall explored by the array. Preferably the electrodes are recessed slightly below the surface of an insulating supporting pad which is moved along and in contact with the formation wall.

Preferably at least four, and in especially preferred embodiments at least five to ten, such laterally spaced electrodes are used. Preferably also, more than one row of such laterally-spaced SP-sensing electrodes is used, the electrodes in at least some of the rows being aligned with electrodes in at least one of the other rows, along the direction of logging motion, to enable use of differential SP measurements and/or to provide useful redundant SP information; in some cases at least some of these rows are not so aligned, but instead contain electrodes in staggered positions, thereby providing more complete coverage of the logged segment of the bore hole wall and correspondingly more continuous SP information in the direction normal to the direction of logging motion.

The above-described use of a plurality of electrodes spaced along the direction transverse to the logging direction, and the use of the spontaneous potentials at these electrodes to form a two-dimensional visual image of the SP of the wall segment scanned by the electrode array, has been found to render SP logging capable of producing reliable, easily observed and easily interpreted indications of the fine structure along the wall of an earth formation, even in high-resistivity muds. This is true despite the typical presence of substantial interfering noise.

The four different kinds of noise described briefly above which interfere with conventional SP measurement may still be present at times in the measurements of the invention, but these noises can be readily monitored, and their effects largely obviated or at least mitigated greatly, as described below:

(1) Changes in the Potential of the Reference Electrode

These changes will affect the absolute SP's in a given row of electrodes by the same amount, and will not affect the differential SP's between an electrode in one row and another electrode in another row axially aligned with it. Such noise can be easily recognized as perfectly horizontal features in the absolute SP image, either visually or with the aid of computer software, and can be removed by using relative SP measurements as described below.

(2) Polarization or the Electrodes

The electrodes are recessed in the pad and are not directly in contact with the formation. Even so, the surface properties of one of the electrodes can occasionally change suddenly due to scratching against the formation; however, the resulting measurement noise can be easily recognized in the SP waveform or image as isolated decaying spikes in the signal from one of the electrodes. Once recognized, the noise is easy to remove by signal processing. The surface properties of each one of the electrodes can also change slowly, resulting in slow drifts of the measured potentials. Since a plurality of measurements are made, such drifts can be removed by signal processing, for example, by a known equalization algorithm which is based on the assumption that the statistics of the signal measured by individual electrodes over a large depth interval should be the same for all buttons.

(3) Bimetal Currents

In the absence of noise, the absolute SP and the differential SP measurements are redundant. The differential SP between a pair of vertically aligned electrodes, say electrodes 1 and electrode 2, measured at a given time $t_1$ should be the same as the difference between the two absolute SP's of electrode 1 measured at different times $t_1$ and $t_2$, where $t_2$ is the time when electrode 1 passes the same position on the borehole wall as electrode 2's position at time $t_1$. That is, the differential SP can be obtained by numerically differentiating the absolute SP; or conversely, the absolute SP can be obtained by numerically integrating the differential SP. However, this redundancy relationship is no longer true in the presence of the bimetal currents. The source of the bimetal current is in the tool and will move with the tool. The positions of the source of the bimetal current at $t_1$ and $t_2$ are different; therefore, the differential SP between electrode 1 and electrode 2 measured at time $t_1$ is not the same as the difference between the two absolute SP's of electrode 1 measured at times $t_1$ and $t_2$, and therefore the differences between absolute and relative measurements provided by the multiple row design can be used to detect the presence of bimetal currents.

(4) The Ohmic Potential Drop from the Flow of the SP Current in the Borehole

The insulating pad pushed against the formation prevents the SP currents from flowing in closed loops in the borehole. The electrodes mounted on the pad are much closer to the formation than the conventional SP sensors mounted near the center of the borehole. Therefore, the measured SP, being very close to the value of the SSP, responds to individual layers even if they are thinly laminated.

Because according to the invention the SP signals are presented in the context of a two-dimensional visual image of the wall, and because the expert viewer has a knowledge of the kinds of fine structures which may exist and are likely in the chosen geological location, he is able mentally to ignore or compensate for the effects of substantial amounts of spurious signals, while still obtaining an understanding of the actual fine structure of the wall. This capability has been found to change SP monitoring from a low-definition, unreliable source of earth formation information, to one which rivals resistivity measurement in definition and reliability and offers an alternate source of information about fine structure. Also, because it does not rely upon measurement of an injected current, it is usable with relatively high-resistance muds, such as oil-based muds; it is especially useful in providing reliable discrimination between shale and sand, even in oil-based muds.

The above-indicated preferred features of the geometry of the array, its positioning and motion, and the preferred signal processing, serve to enhance the capabilities of this SP system in the respects above indicated, as will be described in detail hereinafter.

BRIEF DESCRIPTION OF FIGURES

Other objects and features of the invention will become more readily apparent from a consideration of the following detailed description, taken in connection with the accompanying drawings, in which:

FIG. 4c is a block diagram of one arrangement for detecting certain errors in the SP values obtained with the system of FIG. 4a;

DETAILED DESCRIPTION OF SPECIFIC EMBODIMENTS

Overall Bore-Hole System

Figure 1:
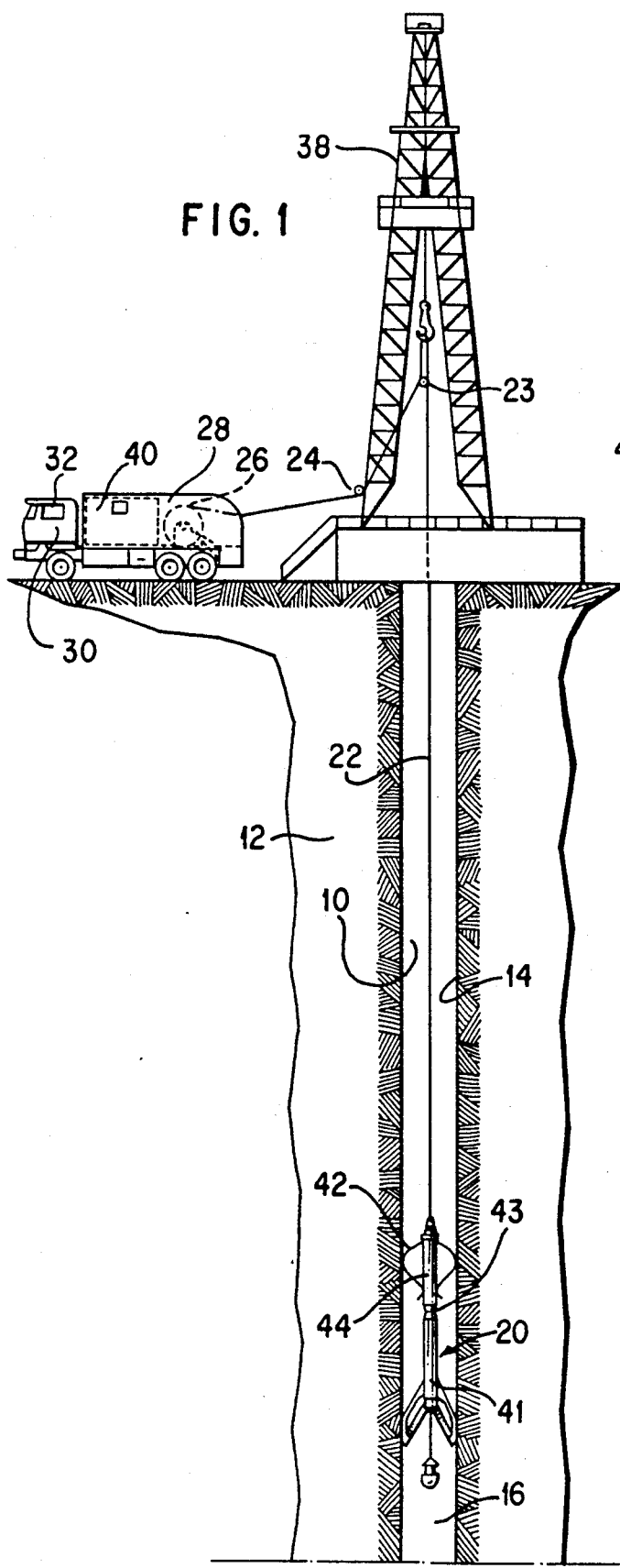
FIG. 1 is a vertical elevational view, diagrammatic in nature, showing a bore hole and associated petrochemical exploration equipment, including a logging tool suspended in the borehole, in which the system and method of the present invention find useful application.

Referring now to the embodiments of the invention specifically shown in the drawings by way of example only, and without thereby in any way limiting the scope of the invention, FIG. 1 shows a bore hole 10 extending vertically into an earth formation 12 to produce a generally cylindrical exposed wall 14. This bore hole will normally have been formed by conventional bore hole drilling equipment typically used in exploration for petrochemical deposits. During such drilling, a drilling mud is commonly used, and such is assumed still to be present in the bore hole, as at 16; the mud may be water-based, and hence have a rather low resistivity, but it may instead be an oil-based mud having a high resistivity, e.g., greater than a million ohm-meters.

Suspended within bore hole 10 is an SP monitoring tool 20, hanging from a pulling cable 22 which at its upper end extends around sheaves 23, and 24 to the spool 26 of a winch 28. The spool of the winch can be rotated in either direction, to raise or lower the tool, by operator control of an engine 30 in the winch-carrying vehicle 32. Sheave 23 is typically supported from a derrick frame 38 centered over the bore hole. On the winch-carrying vehicle 32 there is also located electronic apparatus 40, which permits control of the various operations during a logging run, as well as providing signal processing and storage of the signals from the SP electrodes. This general overall arrangement itself being old in the prior art, it need not be described here in detail, except insofar as it requires special modification for use in connection with the present invention.

The logging tool comprises a sonde 41 and an electronic cartridge 44, connected to each other by an articulated physical connection 43. Centering of the tool in the bore hole may be facilitated by bowed-spring centralizers such as 42, typically comprising four equiangularly spaced spring bow members extending radially outward toward the borehole wall.

Figure 3A:
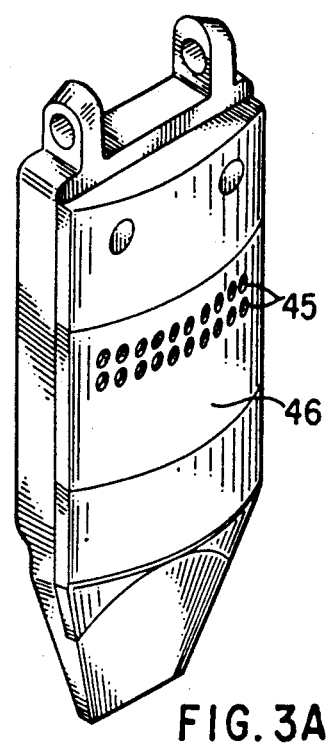
FIGS. 3a, 3b, and 3c are a perspective view, a horizontal sectional view and a front elevational view, respectively, of a supporting pad and an array of SP measuring electrodes mounted thereon, in accordance with one preferred embodiment of the invention.

As will be described in more detail hereinafter, the electronic cartridge contains an electronic amplifier for each of the SP electrodes 45 (FIG. 3A) on each of the four insulating pads such as 46, positioned at 90° intervals about the longitudinal axis of the sonde apparatus, and also contains time-multiplexing apparatus for sampling each of the SP levels on the SP electrodes to produce a single serial train of pulses from each pad, each pulse representing the concurrent strength of the SP level at one of the electrodes. If a hollow pad is used, it may be strengthened by filling it with pressurized oil, in a manner known in the art to protect it against the crushing force of the mud at very great depths. These multiplexed signals are preferably applied to a digitizer, so that the serial samples are converted to a signal made up of serial digital bits for transmission through one of several (typically 7) wires contained in the armored pulling cable 22 which extends up to the electronics apparatus 40 on the winch-carrying vehicle. Such sampling and digitizing means are well known for other purposes, particularly in connection with the FMS TM system for the measurement of resistivity of an exposed earth formation wall by means of electrodes carried on a pad which travels along the wall. In the present case, the first amplifier connected to each electrode preferably has a high input impedance.

Figure 2:
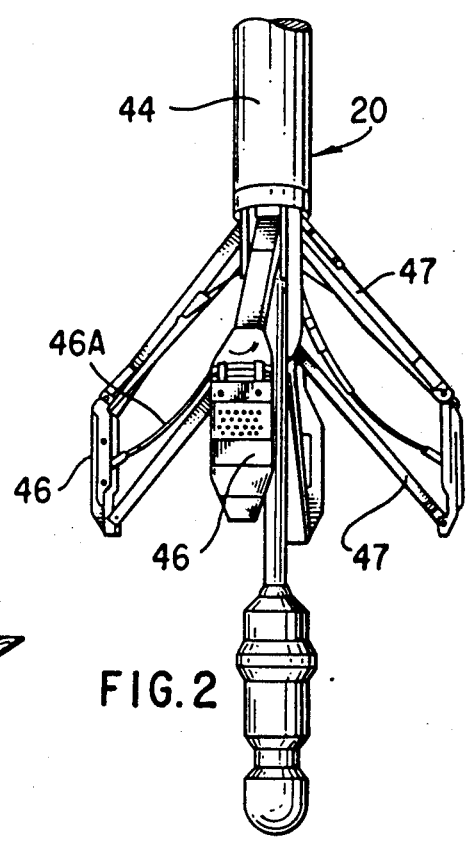
FIG. 2 is an enlarged perspective view, partly in section, showing more clearly a portion of the sonde represented diagrammatically in FIG. 1, which carries apparatus in accordance with the present invention.

Each of the pads such as 46 is mounted on a pair of supports such as 47 (FIG. 2), which urge the pads outwardly against the bore hole walls, by spring action or hydraulic pressure in a manner known in resistivity measuring systems. The pads and supports are of electrically insulating material, at least at the surfaces thereof exposed to the surrounding mud, and the sonde is preferably also clad in insulating material.

It is understood that the complete system may also utilize, at the surface station, appropriate known depth-information generating apparatus for producing signals indicative of the depth at which the measured SP's occur, which apparatus may be the same as, or similar to, that which has been utilized previously in connection with resistivity logging. The digitized signals representing the SP's are appropriately associated, in the electronics apparatus 40, with the corresponding numbers which represent the depth at which each SP at each electrode is measured; thus, the electronic equipment is able to generate and store digital information representing the values of the SP at each electrode, for each depth at which it is sampled. This information may be utilized in the electronic equipment 40 to produce, after appropriate signal processing, a corresponding bi-dimensional visual image, or in some cases may be recorded on any appropriate storage medium such as tape for transfer to a central location where signal processing and transfer to bidimensional image form may be accomplished.

Electronics System

The electronic aspects of the system are indicated generally by the block diagrams of FIGS. 4a through 4d. The SP sensing electrodes such as 45, which may for example be 20 in number and arranged in two aligned rows of ten, are sampled in known, established order by a time multiplexer, the output samples of which are then digitized. Using an upward logging velocity of 1800 feet/hour, the entire set of SP electrodes may thus be sampled at a repetition rate of about 60 times/second. Each electrode is thereby sampled about every 0.1 inch in its upward travel, in this example.

Figure 4A:
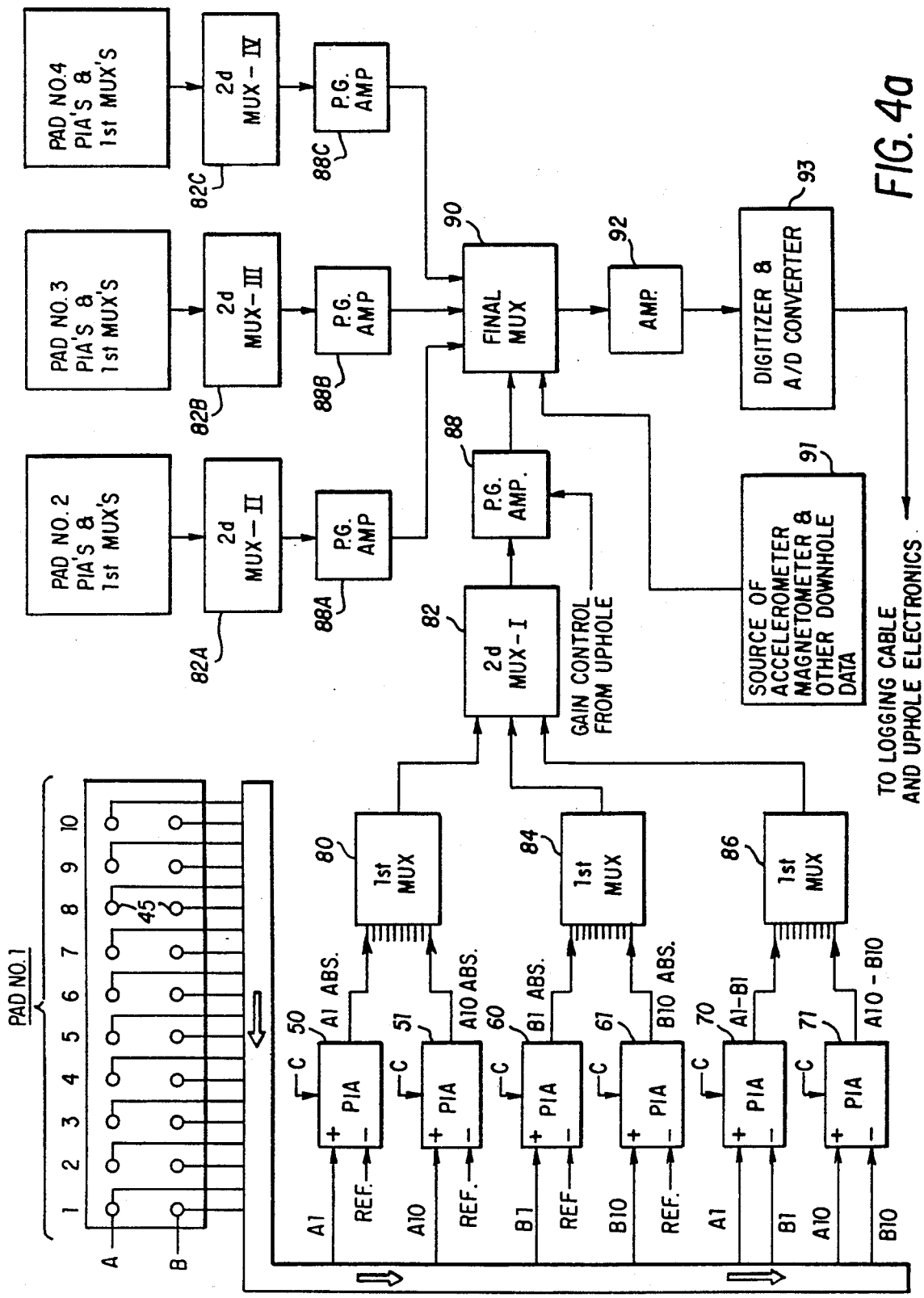
FIG. 4a is a schematic diagram, principally in block form, illustrating the general nature of a preferred electrical system preferably carried in the down-hole logging tool, which responds to the SP's to generate and deliver to the surface time-multiplexed digital data signals representing the SP values at the array electrodes.
Figure 4B:
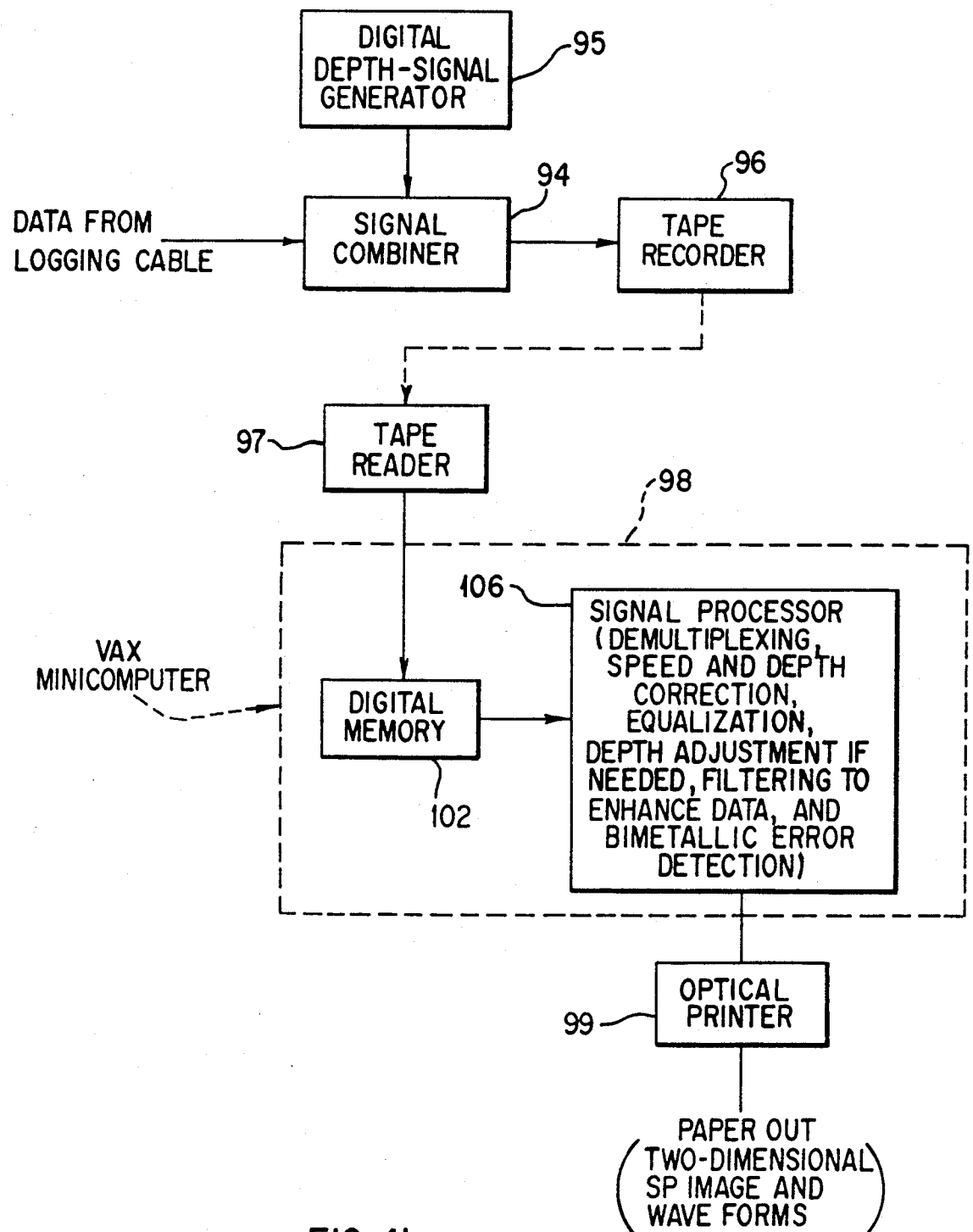
FIG. 4b is a block diagram illustrating apparatus at the surface for receiving said data signals and for producing a two-dimensional visual SP image therefrom.

FIG. 4a shows the "down-hole" electronics carried by the logging tool, and FIG. 4b shows the "up-hole" electronics on the winch vehicle 32.

In this example it is assumed that each pad carries two horizontal rows A and B (see FIG. 4a) of ten electrodes each, the electrodes in the respective rows being vertically aligned with each other. In use during logging, the rows normally (and in this example) extend substantially azimuthally about the longitudinal (i.e. vertical) axis of the logging tool. In FIG. 4a, each electrode is specifiable by its row (A or B) and its column number (1 through 10).

Figure 3C:
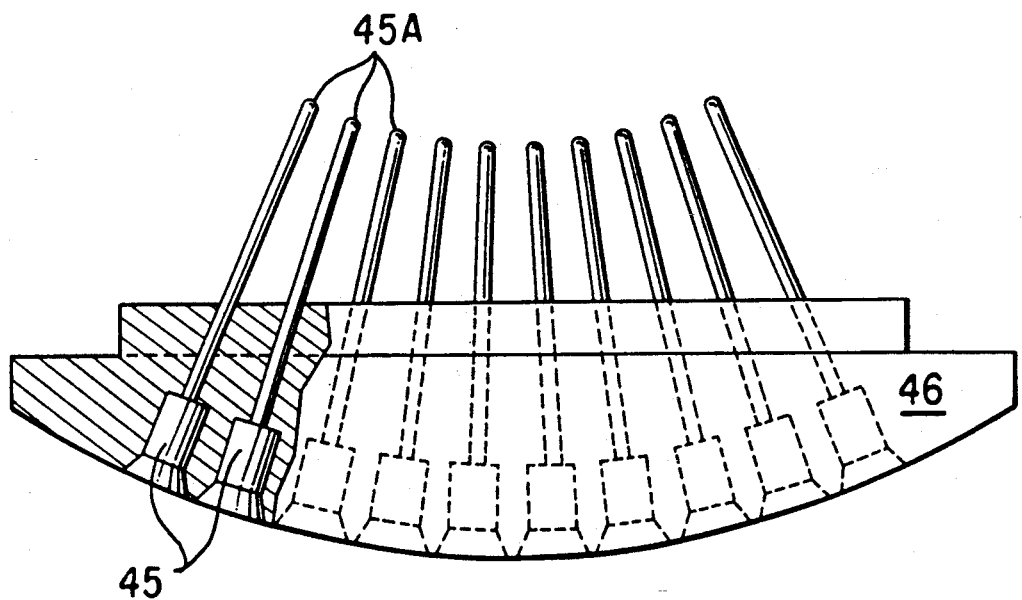
Figure 3B:
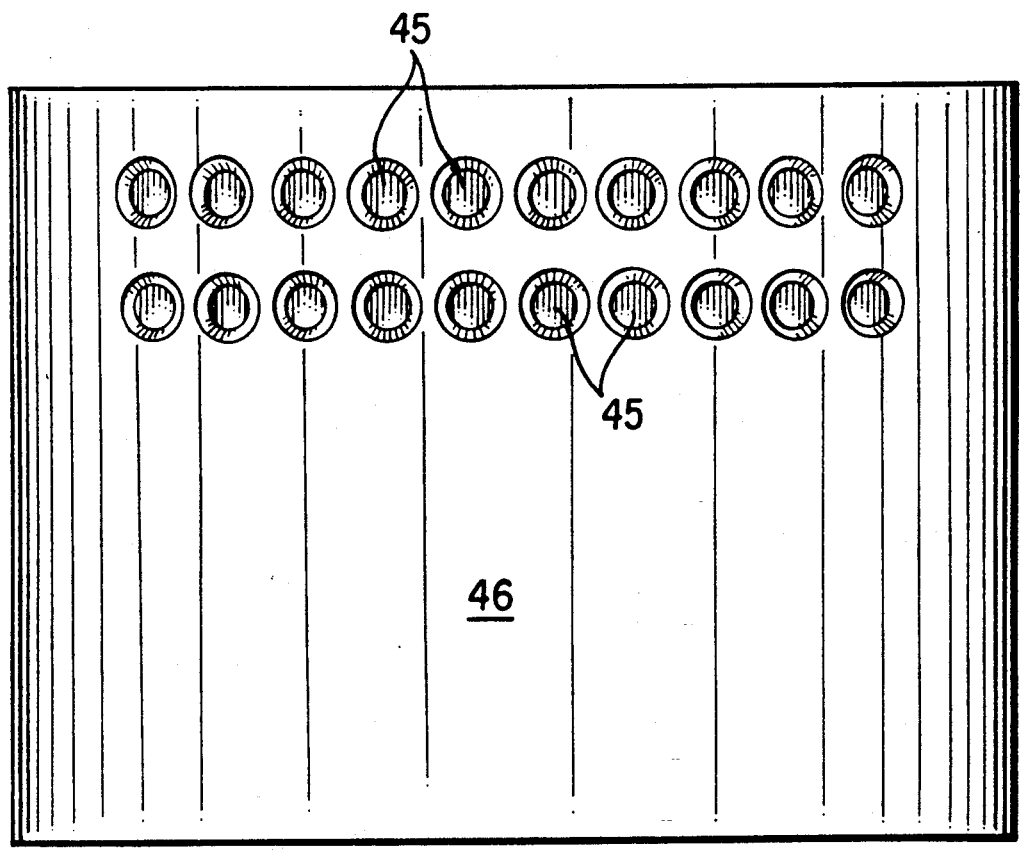

As shown in FIG. 3c, each electrode 45 is connected to a corresponding wire such as 45A extending, inside the pad and leading, by way of a cable such as 46A (FIG. 21), to an input terminal of a respective programmable instrumentation amplifier (PIA). To generate so-called "absolute" SP's, each electrode is connected to the plus input of a PIA, while the minus input of the PIA is supplied with a "reference" potential, in this example preferably the potential level of the mud Pit on the surface.

Each PIA (FIG. 4) is controllable by a control signal applied over a respective control line marked "c" which is activated at every tenth of an inch of motion of the electrode pad, to cause each PIA to sense and hold the contemporaneous value of its output potential until the next control signal is applied to it. Each successive set of such PIA output values is designated as a "frame", and the PIA's act essentially as sample-and-hold devices, performing a frame-grabbing function in "freezing" the electrode potential values every tenth of a second, long enough for the following multiplexer to sample all of them sequentially before the next frame of electrode potentials is formed and sampled, as described hereinafter.

More particularly, ten PIA's, of which only two (50,51) are shown, are supplied at their respective negative input terminals with a selected reference voltage and at their positive input terminals with the SP's present at electrodes A1 through A10, respectively. The outputs of the ten PIA's 50,51 etc. are therefore the absolute SP's at the ten electrodes A1 through A10 all reset to the new electrode potential values at every tenth of an inch of motion of the electrode pad.

Similarly, the SP's at SP electrodes B1 through B10 are supplied to the positive input terminal of ten corresponding PIA's, of which only two (60,61) are shown, to produce at their output lines the ten absolute SP's for SP electrodes B1 through B10, these values being reset at the frame rate, i.e. for every tenth of an inch of upward motion of the pad, in this example.

Relative values of the SP's on one row of electrodes, measured with respect to aligned electrodes in the other row, are obtained by supplying each of the ten SP's from the ten electrodes of row A to the plus input terminals of ten corresponding PIA's (of which only two, numbered 70,71 are shown), and supplying the SP's at the respective corresponding longitudinally-aligned electrodes of row B to the negative input terminals of the same ten PIA's. The result of this is to produce, at the output lines of the latter ten PIA's, ten relative SP's (A1-B1) through (A10-B10) during each frame.

During each frame, the ten absolute SP's from the ten row A electrodes are supplied to an input terminal of a 1st MUX 80, which samples them in sequence and supplies the samples to an input terminal of 2nd MUX-I 82; each frame of the ten absolute SP's from the row B electrodes is supplied to another 1st MUX 84 and thence to a second input terminal of 2nd MUX-I; and each frame of the ten relative SP's from rows A and B is supplied through a 1st MUX 86 to a third input terminal of 2nd MUX-I.

The resultant combined SP samples are supplied through a programmable-gain amplifier 88 to a Final MUX 90, which is supplied at its other input terminals with SP samples from the other three pads, derived and multiplexed exactly as for Pad #1, corresponding parts being designated by corresponding numerals. The Final MUX combines all four pad signal samples with other conventional "down-hole" data from source 91, for example accelerometer and magnetometer information, for application through amplifier 92 and A/D converter 93 to the logging cable 22 which leads to the uphole electronics. The levels of each of the samples taken by the multiplexer may be digitized to the nearest of 12 different amplitude levels, each represented by a different 4-bit binary number. The amplifiers to which the electrodes are directly connected preferably have very high input impedance to avoid undue electrical loading of the geologic source of SP in the wall of the formation. The details of the system shown in FIG. 4 may be closely similar to those of the previously-known FMS system, except for the electrode-and-pad arrangement and the arrangement for amplifying the electrode signals and for combining them to produce absolute and relative SP's.

As shown in FIG. 4b, the signal from the downhole electronics arriving at the up-hole electronics by way of logging cable 22 is supplied to a signal combiner 94, to which the output of a digital depth signal generator 95 is also supplied. The SP data and the corresponding depth data are then recorded on tape recorder 96. When desired, a tape reader 97, at any convenient location, is supplied with and activated to read the tape from recorder 96 into a minicomputer such as a Model 750 VAX minicomputer 98, which processes the data to enhance its accuracy and clarity and supplies it in appropriate form to a commercial optical printer 99, such as a Visor Model S. The printer operates to produce a paper output containing a two-dimensional intensity-modulated image or map of the SP for each area of the bore-hole wall traversed by the four pads. Printer 99 preferably also produces an individual SP waveform for any of the electrodes, and preferably shows also the corresponding pad depth. The manner in which the data are processed and formatted for application to the printer may be similar to the manner in which this is done for FMS data in the FMS system.

More specifically, the minicomputer 98 stores the received SP data in digital memory 102 until further processing is to be performed by the programmed signal processor 106. The processor preferably provides de-multiplexing speed and depth correction, equalization and filtering, which are now standard functions in processing data (such as FMS data) in logging systems; depth adjustment is also preferably provided in cases where each sampling frame samples electrodes in staggered rows, i.e., wherein the electrodes are not longitudinally aligned, so that to produce a proper visual display across a transverse line in the final image, data must be used from different sampling frames, occurring at different times, in order that all electrode data presented on a horizontal line in the image be for the same horizontal line in the wall. With other types of sampling this may not be necessary. Bimetal error correction is preferably also provided in the signal processor 106.

Figure 4C:
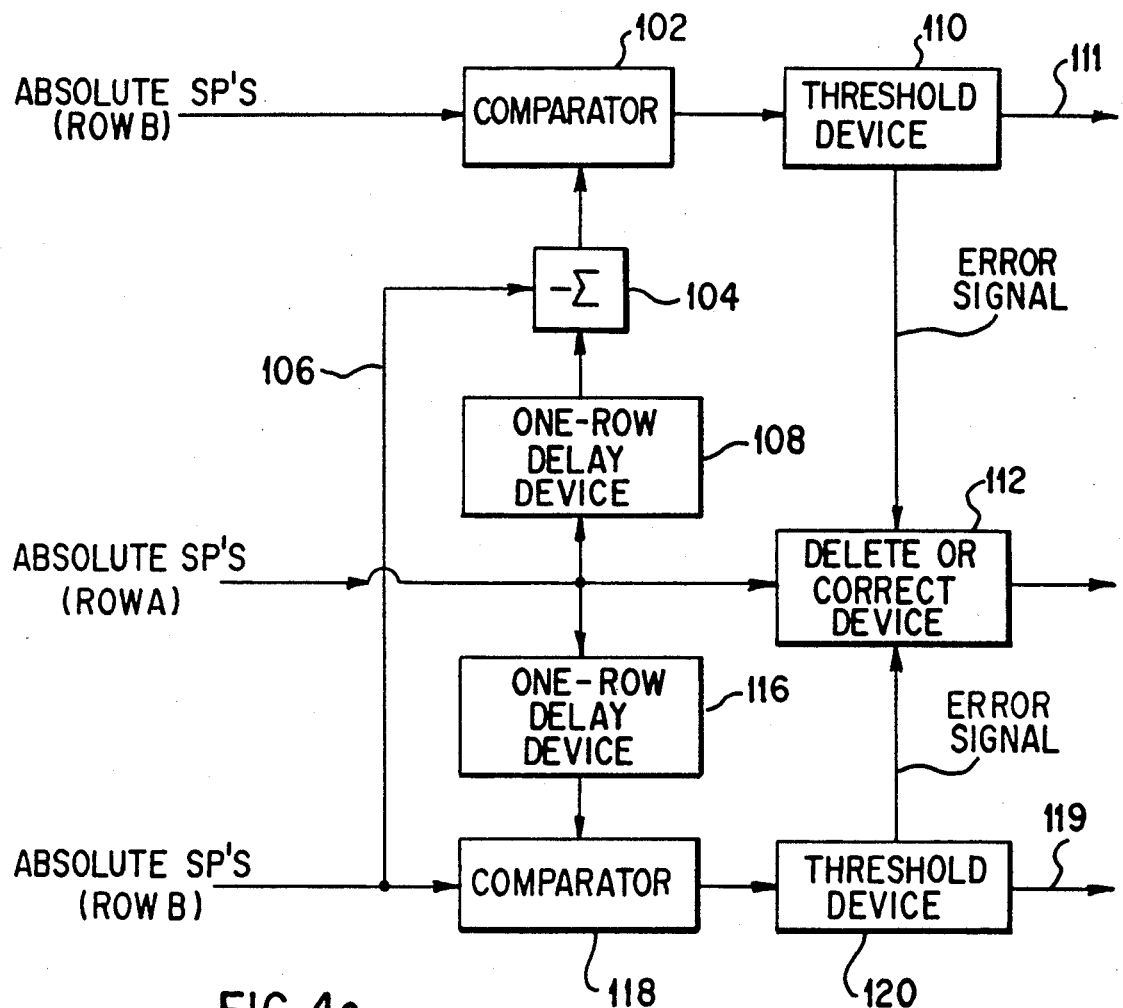

One arrangement for accomplishing the bimetal error correction is shown in FIG. 4c. The purpose of this arrangement is to determine whether the relative SP between any two vertically aligned electrodes at a given depth of the pad is equal to the difference between the two corresponding absolute SP values at one of the electrodes measured when it is at the positions of the two electrodes for which the relative SP was measured: and whether the sets of absolute SP data obtained by one row of electrodes at one depth are the same as the sets of absolute SP data obtained from the other row of electrodes when at that same depth.

Thus in FIG. 4c the digital data representing relative SP's are supplied to a comparator 102, while the absolute SP's for the corresponding electrodes of Row A are supplied to a subtractor 104 directly over line 106 and also by way of a "One-Row Delay" device 108, which provides a delay equal to that required for the pad to move upwardly by the vertical distance between the centers of the rows of electrodes. The output of the subtractor is supplied to an input terminal of comparator 102. The comparator produces an output signal indicative of differences between its two inputs, and supplies this difference to a threshold device 110. If the relative SP's between the electrodes in rows A and B for one pad position are substantially the same as the corresponding differences between the absolute SP's for Row B electrodes at positions differing by the inter-row distance, then the threshold device produces no output; however, if the comparator senses a difference greater than a preselected threshold amount, the threshold device puts out an error signal at 111 to warn of the discrepancy. The alarm signal may also be supplied to the Delete or Correct device 112, to delete the erroneous data or replace them with representative values, e.g. an average of adjacent electrode values.

Also in the system of FIG. 4c, absolute SP data from Row A are supplied through a One-Row Delay Device 116 to a comparator 118, which is also supplied directly at its other input terminal with the corresponding absolute SP data from Row B. The output of the comparator 118 is supplied to a threshold device 120, the output signal of which provides a warning at line 119 and/or activates Delete or Correct device 112, only when there is a substantial difference between the absolute SP's produced at a given depth by Row A as compared with the absolute SP's produced by Row B at that same depth.

Figure 4D:
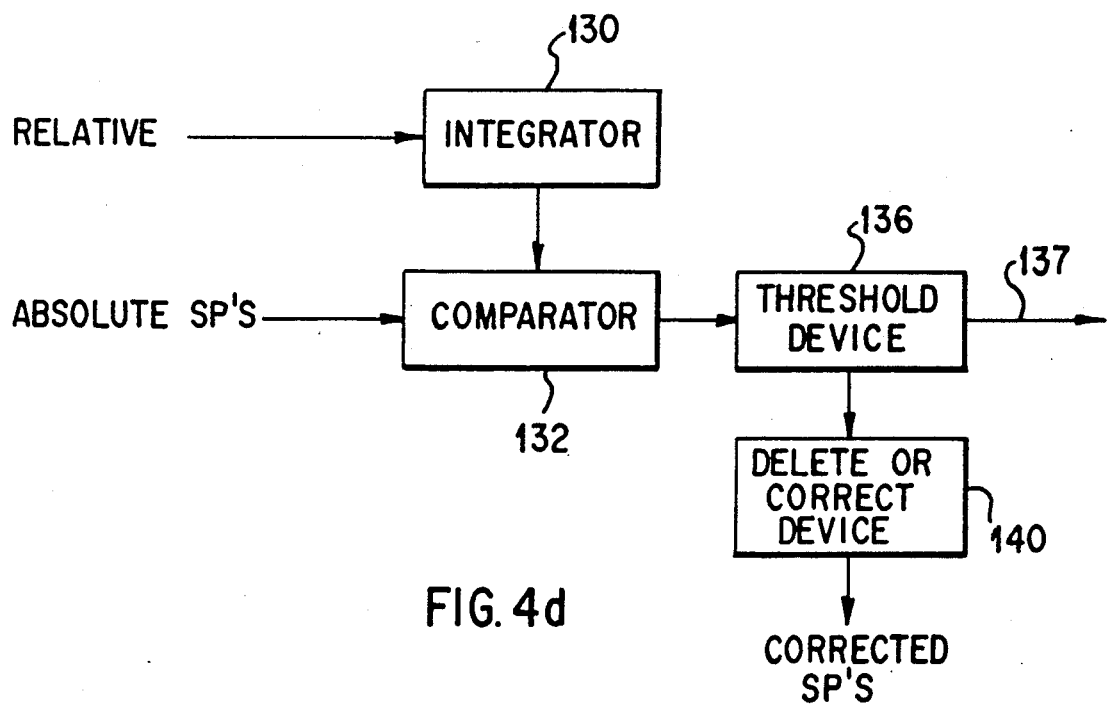
FIG. 4d is a block diagram of another arrangement for detecting such errors.

FIG. 4d shows another error sensing and correcting arrangement which may be used in the over-all system. The relative SP's are integrated in an integrator 130 to produce calculated values of SP, and these calculated values are compared with corresponding measured values of absolute SP in a comparator 132. Any differences are supplied to a threshold device 136, which produces an error signal on line 137 and/or activates Delete or Correct device 140 only when the differences between calculated absolute SP's and measured absolute SP's differ substantially from each other.

It will be understood that the functions described with respect to FIG. 4b through 4d are preferably performed by software programs in minicomputer 98, rather than by discrete hardware for each function.

Figure 5A:
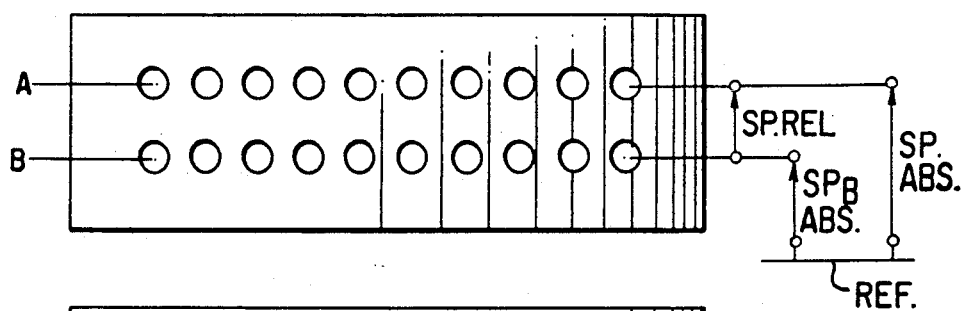
FIGS. 5a–5e comprise a set of schematic diagrams illustrating other geometric arrangements of electrode arrays which may be used in various embodiments of the invention.

FIG. 5a shows in more detail typical dimensions of the 2×10 SP electrode array described above. The electrodes are typically about 6 mm in diameter and recessed by about 3 mm, with vertical center spacings of about 15 mm and horizontal center spacings of about 10 mm. The relative SP's are taken between each electrode and its aligned neighbor in the other row, and the absolute SP's are taken between each electrode and a remote reference, such as the pulling cable armor.

Figure 5B:
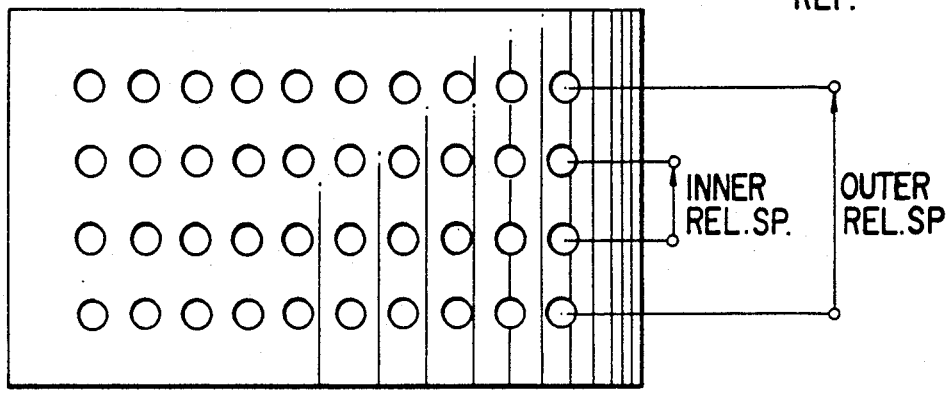

FIG. 5b shows an array of four aligned rows of ten SP electrodes each; relative SP's can be derived, for example, between the two outer rows and between the two inner rows, as shown. Absolute SP's are derived as described above, for each electrode. This provides useful redundant relative SP's and absolute SP's, to enable further discrimination against noise.

Figure 5C:
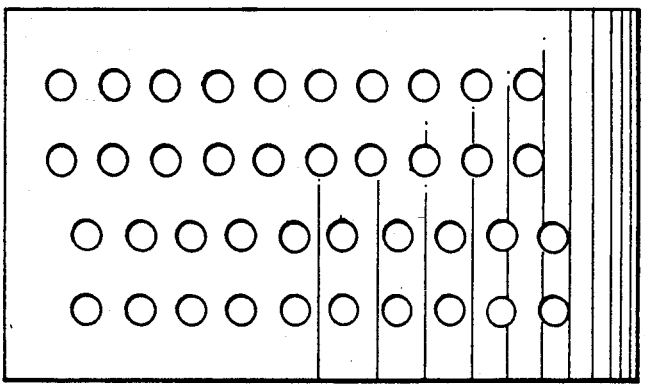

FIG. 5c shows two rows of SP electrodes laterally staggered with respect to each other. As is known in the prior art with respect to FMS systems, such staggering enables more complete lateral coverage of the logged wall area; depth adjustment of the data is preferably performed during signal processing so that data produced by the electrodes at the same given horizontal wall position will form the corresponding horizontal line in the two-dimensional final image.

Figure 5D:
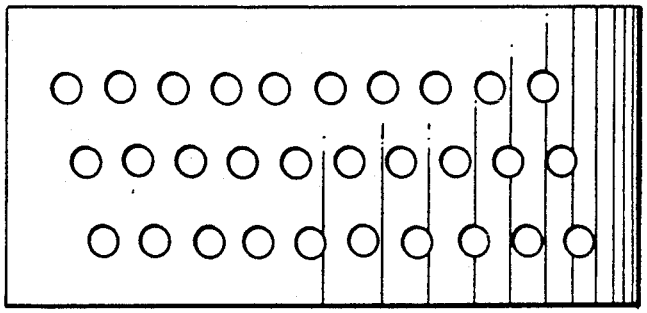

FIG. 5d shows an array of two ten-electrode rows of SP electrodes aligned with each other, and two other tenelectrode rows aligned with each other but staggered with respect to the first two rows. This combines the advantages of the arrays of FIGS. 5a and 5c.

Figure 5E:
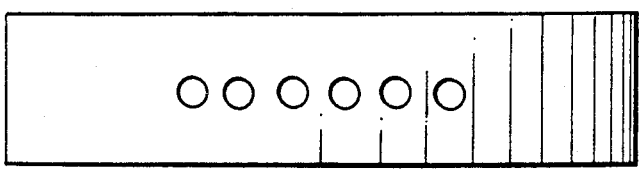

FIG. 5e shows an array using three mutually staggered arrays of SP electrodes, to obtain even more complete coverage of the lateral dimension of the logged wall area; again, depth adjustment is typically employed.

FIG. 5f shows a simplified electrode array, adequate for some purposes but not preferred for most useful results; it comprises a single row of only six SP electrodes.

Figure 6:
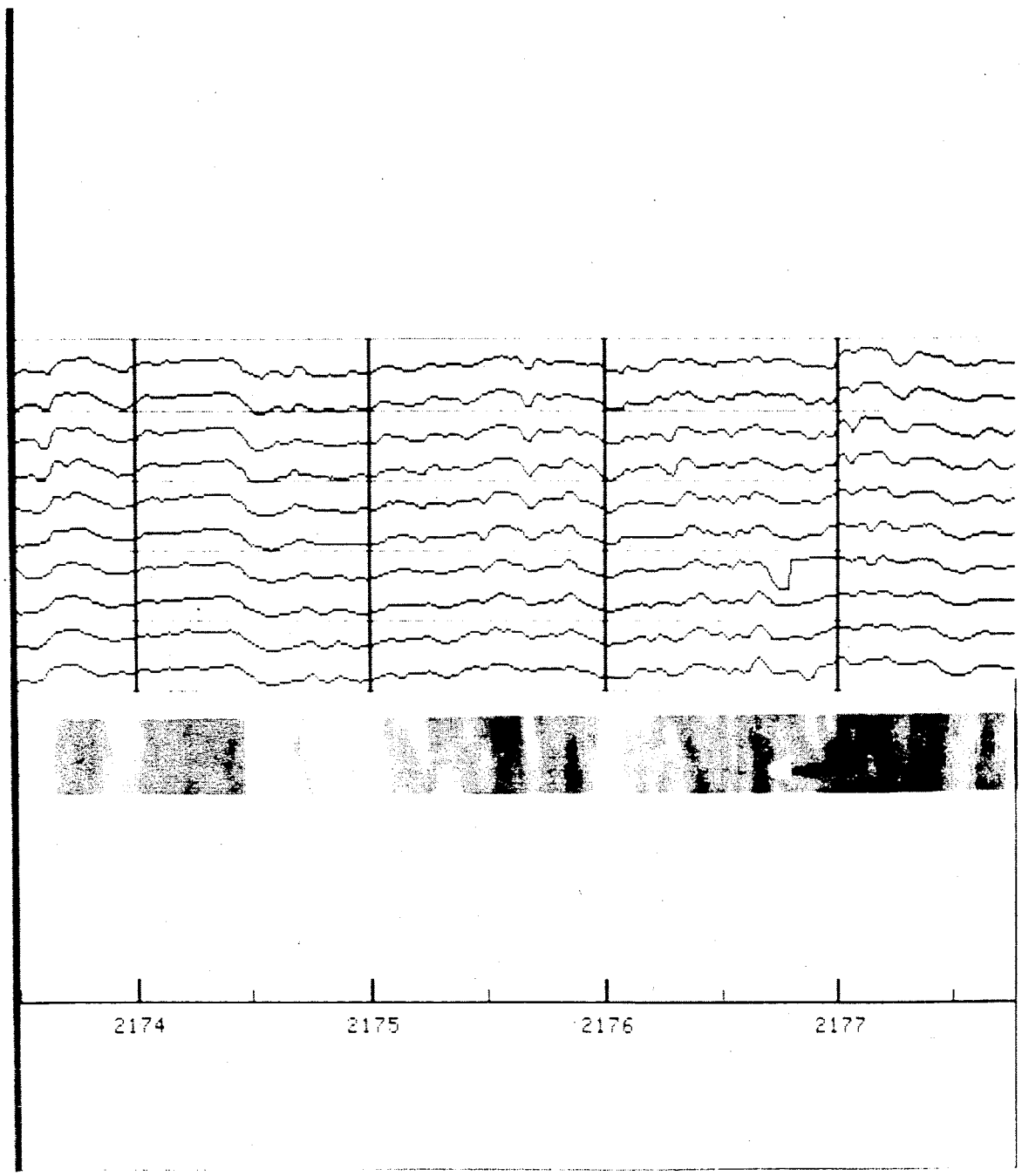
FIG. 6 comprises plots of 10 SP waveforms produced by two rows of SP electrodes in an array such as is shown in FIG. 5b, using a water-based mud, together with the corresponding SP log.

FIG. 6 shows a series of ten typical single-line SP waveforms produced by printer 99 in response to a single logging run by a row of ten recessed SP electrodes, such as those in the first row of FIG. 5b, and the corresponding SP log. The logging was performed in water-based mud. Here, darkness in the image represents a shaly formation and lightness represents a cleaner (less shale) carbonate formation.

Figure 7:
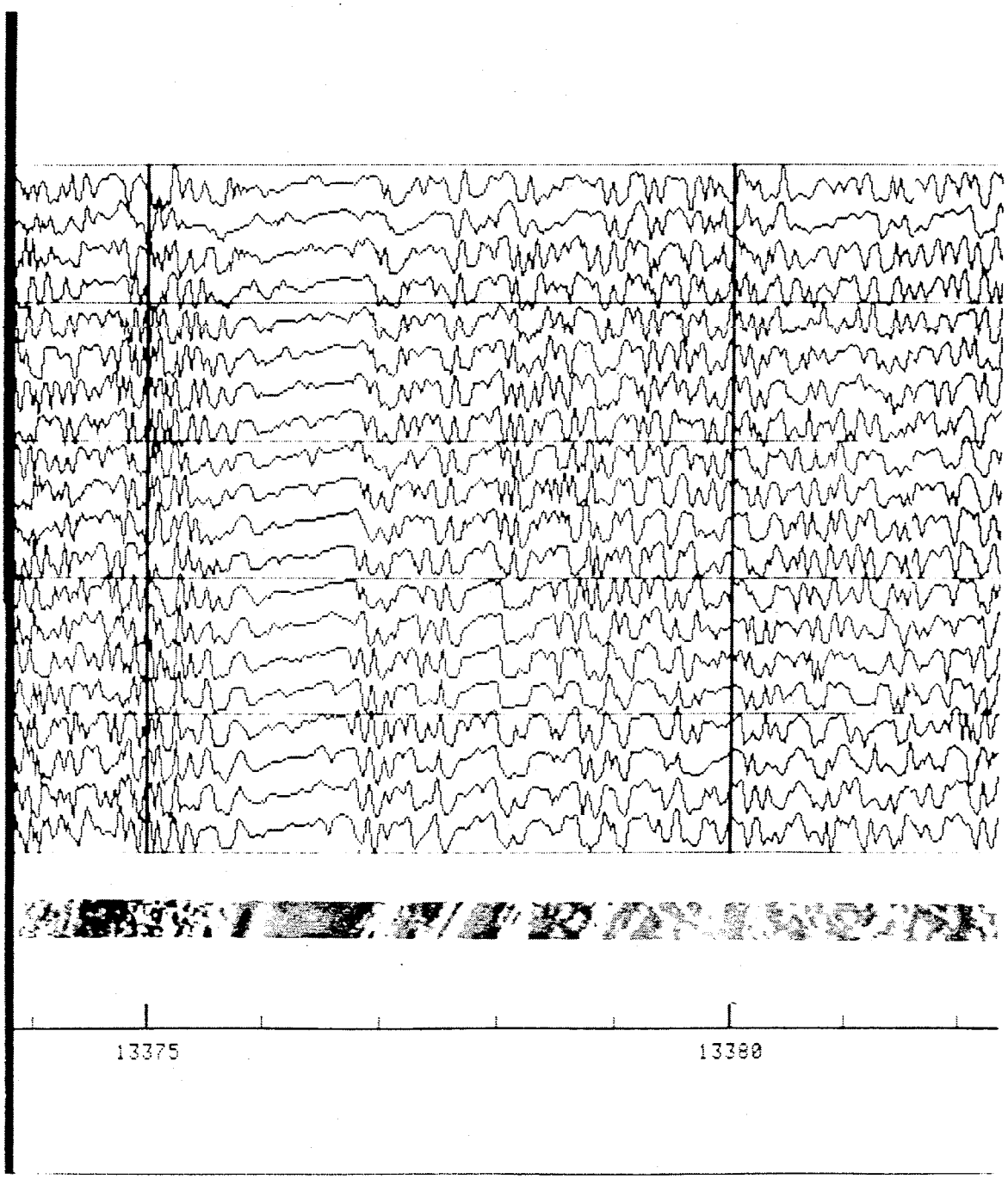
FIG. 7 shows 20 SP waveforms produced by the system of FIG. 5c, using an oil-based mud, together with the corresponding SP log.

FIG. 7 shows 20 SP logging waveforms produced by an array like that of FIG. 5c, together with the corresponding intensity-modulated bi-dimensional image, using a conventional high-resistivity oil-based mud, where the formation resistivity was greater than 2,000 ohm-meters. Fine detail is clearly observable in the image.

There has therefore been provided a method and apparatus for providing two-dimensional intensity-modulated image of the SP along areas of the exposed wall of an earth formation, producing fine detail of the variations in SP along the wall even when using high-resistivity muds such as oil-based muds. Although the bidimensional image is typically intensity-modulated, it may be otherwise modulated; for example, the logging signal may be used to color modulate the image, whereby different SP values will produce different colors in the image.

Accordingly, while the invention has been described with particular reference to specific embodiments in the interest of complete definiteness, it may be embodied in a variety of forms diverse from those specifically shown and described without departing from the spirit and scope of the invention.

What is claimed is:

1. A system for producing indications of the spontaneous potentials existing along a longitudinally extending segment of an exposed wall of an earth formation, comprising:

an electrically insulating electrode support, an array of mutually-insulated SP electrodes supported thereon and recessed below a surface of said support, and means for moving said support along a predetermined logging direction with said surface in contact with said wall;

said array comprising a plurality of said electrodes differently positioned along a direction transverse to said direction of logging motion of said array;

potential measuring means as connected to each of said electrodes for producing respective SP signals indicative of the values of the spontaneous potentials at said electrodes; and visual-image forming means supplied with said SP signals for forming a visually-observable twodimensional image corresponding to the pattern of SP values in the segment of said wall traverse by said array during said logging operation and extending substantially continuously transversely of said wall.

2. The system of claim 1, wherein said electrode support comprises a pad of electrically insulating material and said electrodes are recessed in depressions in said pad.

3. The system of claim 1, wherein said plurality of electrodes number at least five.

4. The system of claim 1, wherein at least some of said electrodes of said array are spaced from each other along said direction of logging motion.

5. The system of claim 4, wherein at least some of said electrodes are aligned with each other along said direction of logging motion.

6. The system of claim 4, in which at least some of said electrodes are aligned with others of said electrodes along said transverse direction.

7. The system of claim 4, wherein said electrodes are arranged in a plurality of rows extending along said transverse direction, and said rows are spaced apart from each other along said direction of logging.

8. The system of claim 7, wherein there are at least two of said rows, and wherein said electrodes in a first of said rows are aligned with those in a second of said rows along said direction of logging motion 9. The system of claim 1, wherein said support comprises a pad, said electrodes are recessed in said pad, and said system comprises means for urging said pad outwardly against said wall during said logging operation.

10. The system of claim 1, comprising signal processing means connected between said SP electrodes and said visual-image forming means for modifying said SP signals to improve said image.

11. The system of claim 5, comprising means for producing signals indicative of substantial discrepancies between (a) the relative SP existing between a pair of longitudinally aligned electrodes at a given time $t_1$ when the leading electrode of said pair is at a depth $d_1$, and (b) the difference between the absolute SP of the leading one of said electrodes at time $t_1$ and the absolute SP of that same electrode at time $t_2$ when it reaches the depth $d_1$.

12. The system of claim 5, comprising means for producing signals indicative of substantial discrepancies between the absolute SP of an electrode of said array when it is at a given depth, and the absolute SP of an aligned trailing electrode in said array when it is at said given depth.

13. The method of logging an earth formation to detect and display information as to the values of spontaneous potential SP along a longitudinally extending segment of an exposed wall of said earth formation, comprising:

moving along and adjacent to a two-dimensional segment of the length of said wall an array of spaced-apart, mutually-insulated SP electrodes extending transversely to the direction of logging motion and parallel to the adjacent wall;

sensing the spontaneous potential SP at each of said electrodes as said array is moved along said wall; and using said SP to control the formation of a two-dimensional image of the values of SP along the segment of said wall traversed by said array and extending substantially continuously transversely of said wall.

14. The method of claim 13, wherein said electrodes are recessed below the surface of an electrically insulating pad and the pad is pulled upwardly in contact with said wall.

15. The method of claim 13, wherein at least two of said electrodes are aligned with each other along the logging direction, and comprising the step of electrically comparing the relative SP measured between said two electrodes with the difference between the absolute SP's of one of said electrodes for the same two depths for which said relative SP is measured, to derive indications of errors in the values of said measured SP's.

16. The method of claim 13, wherein at least two of said electrodes are aligned with each other along the logging direction, and comprising the step of detecting discrepancies between the absolute SP's sensed at any given depth by said two electrodes.

* * * * *